Figure 1:
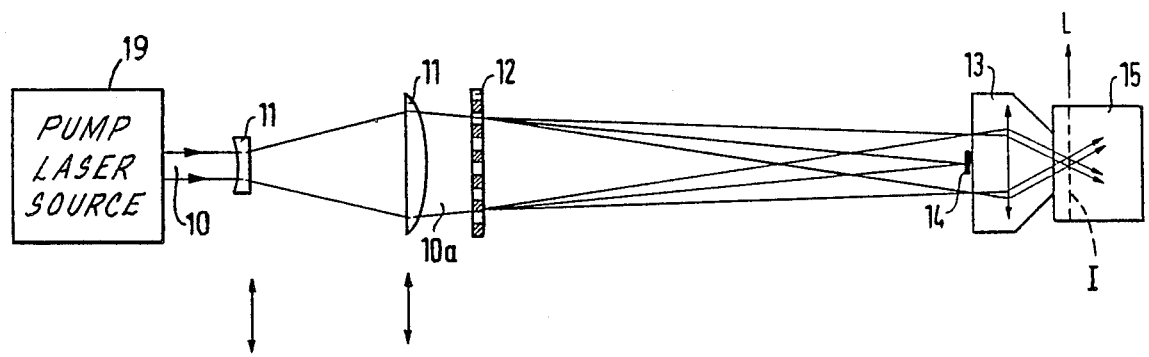

United States Patent [19]
Szatmari et al.

[11] Patent Number: 4,866,730
[45] Date of Patent: Sep. 12, 1989

[54] DISTRIBUTED FEEDBACK LASER

[75] Inventors: Sandor Szatmari; Fritz P. Schaefer, both of Goettingen-Nikolausberg, Fed. Rep. of Germany

[73] Assignee: Max-Planck-Gesellschaft Zur Foerderunf Der Wissenscheften e.V., Fed. Rep. of Germany

[21] Appl. No.: 210,975

[22] Filed: Jun. 24, 1988

[30] Foreign Application Priority Data

Jun. 26, 1987 [DE] Fed. Rep. of Germany ....... 3721218

[51] Int. Cl.$^4$ ................................................ H01S 3/08
[52] U.S. Cl. ...................................... 372/101; 372/96; 372/54; 372/102; 372/70
[58] Field of Search ................... 378/101, 102; 372/54, 372/70, 103, 99

[56] References Cited
U.S. PATENT DOCUMENTS 4,641,312 2/1987 Schäfer et al. ......................... 372/69

Primary Examiner—Leon Scott, Jr.
Attorney, Agent, or Firm—Kinzer, Plyer, Dorn, McEachran & Jambor

[57] ABSTRACT

A laser with distributed feedback utilizes an active laser medium, especially a dye solution contained in a cell, excited by a pump radiation beam that passes through an optical grating or like device, and an optical imaging system arranged between the optical device and the laser medium; the imaging system, in combination with the optical device, forms a striped pump radiation pattern in the laser medium. The optical imaging system contains a microscope lens in retro position, or another scale reducing or demagnifying lens system, and may optionally, include a variable-focus lens for altering the imaging scale and, therefore, the wavelength of the laser emission.

16 Claims, 1 Drawing Sheet

DISTRIBUTED FEEDBACK LASER

The present invention relates to a laser with distributed feedback, of the kind comprising an active laser medium, a beam path for a pump radiation beam, an optical device, such as a diffraction grating, and an optical imaging system interposed between the optical device and the laser medium. The imaging system in combination with the optical device forms a striped pump radiation pattern in the laser medium.

BACKGROUND OF THE INVENTION

From German patent publication No. 2,900,728 and the corresponding U.S. Pat. No. 4,479,220 a dye laser is known, which makes use of distributed feedback to produce ultrashort laser pulses. The distributed feedback laser described therein, which employs an optical grating as a beam divider, has a distinct advantage over earlier designs with a conventional beam splitter, in that the dye-laser wavelength produced is no longer dependent upon the pump laser wavelength. However, the fact that the location of the plane in which the interference pattern for producing the distributed feedback is formed is wavelength-dependent, has proved to be a practical disadvantage. This disadvantage is overcome by an arrangement proposed by another German patent application No. P 3,633,469.3 (U.S. application, Ser. No. 101,962 filed September 28, 1987, now abandoned). By use of a second grating, both the period and the spatial position of the interference pattern are rendered fully independent of the pump radiation wavelength. Disadvantages of this arrangement, however, are the necessity of a second grating, which increases the required expense of both material and time for adjusting the arrangement, and a critically diminished degree of effectiveness for the entire arrangement due to the double diffraction and the associated high loss of light.

SUMMARY OF THE INVENTION

In a laser of the general type and with the characteristics set forth above, the invention resolves the problem of avoiding the described disadvantages of the known and proposed arrangements with minimal investment, and concurrently enables broad-spectrum adjustment of the wavelength of the generated laser emission by the simple shifting of one component.

The preferred embodiment of the invention uses a microscope lens as a demagnifying optical system which, in combination with an optical grating (or alternatively an interferometric devices), produces a pair of coherent collimated pump radiation beams which intersect each other and form, by interference, a pattern of stripe-shaped regions of alternating high and low pump radiation intensity as required for distributed feedback laser stimulation.

Further developements and advantageous modifications are set forth hereinafter in this specification and claims.

SHORT DESCRIPTION OF THE DRAWINGS

Figure 2:
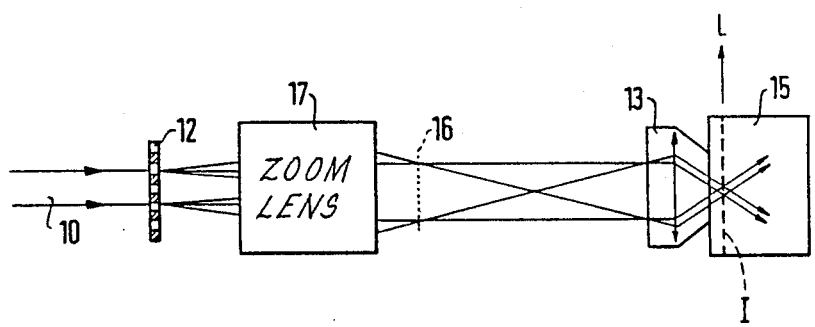

Preferred embodiments of the invention are described in greater detail below with references to the the appended drawings, in which FIG. 1 is schematic representation of a first embodiment of the invention; and FIG. 2 is a schematic representation of a second embodiment of the invention, which permits especially simple adjustment of the wavelength of the laser emission from the active laser medium.

An especially simple embodiment of various realization possibilities of the concept of the invention is described in connection with FIG. 1. A pump radiation beam 10 from a pulsed radiation source 19 is so expanded by a telescope system 11, shown as being comprised of two lens members, that it illuminates an appreciable area of a transmission-diffraction grating or like optical device 12. Grating 12 can be a simple line grating with alternating transparent and opaque stripes, which can be produced, e.g., by vapor deposition of metal onto a transparent substrate.

The period of the grating 12 can be about ten to one hundred pairs of lines per millimeter, which is well within the range easily attainable by the above production process. By appropriate adjustment of telescope system 11, the beam 10a illuminating the grating is rendered slightly convergent, so that at a certain distance (in actual practice about sixteen centimeters) the different orders of diffraction of the pump radiation are focused in a focal plane. In FIG. 1, only the diffracted rays constituting the orders zero, +1, and −1 are shown. The rays then enter a microscope lens from its normal "image side", or a similar reducing or demagnifying optical imaging system 13.

Optical imaging system 13 is depicted only schematically by a two-headed arrow; its entrance-side principal plane is spaced at a distance from the focal plane equal to the focal length of the microscope lens. The pump radiation traverses the lens 13 in the reverse direction compared with the use within a microscope, thus the lens demagnifies. The zero order portion of the beam is shielded out by an opaque mask 14 positioned in the mentioned focal plane. The beams of the two orders +1 and −1 emerge as essentially collimated (parallel-ray) beams from the microscope lens and then intersect each other, to form, by interference, an interference pattern I immediately behind an entrance window of a dye cell or cuvette 15. Thus, the grating 12 and the demagnifying microscope objective lens system 13 duplicate, in effect, the action of a beam splitter.

Cell 15 contains a dye solution which serves as an active laser medium. The interference pattern I produced in the dye solution by the interference of the rays of the +1 and −1 orders is in effect a reduced image of the grating 12. Thus, when use is made of a suitable dye in a solvent with a suitable refractive index, the distributed feedback of the pump radiation amplitude grating thus formed results in a dye-laser emission as indicated by the arrow L.

The arrangement described above has a number of advantages:

1. Since microscope objectives are usually chromatically corrected, the position and size of the image or interference pattern I is fully independent of the wavelength of the illuminating pump laser beam.

2. The arrangement places only minimal demands on the spherical correction of the microscope objective 13, since use is made in the formation of the "image" of the grating of only two symmetrical light beams, which are characterized by a prescribed numerical aperture.

3. For the generation of sub-picosecond laser pulses, an image only about 0.1 mm long is required. In order to produce an adequate number of pairs of lines, grating 12 must be illuminated to a width of about 4 to 6 mm.

This means that a microscope lens system 13 with average nominal magnification of about 40–60 and an image field of 0.2×0.3 mm² is fully adequate for this purpose.

4. The usual slight curvature of the image field exhibited by microscope lenses has no apparent effect on the functioning of the arrangement described here.

5. The required numerical aperture is essentially determined by the shortest laser wavelength necessary with a given grating 12 having a predetermined number of pairs of lines per mm. It can be shown that, for the arrangement described here, numerical aperture $= (\lambda_p \cdot \eta)/\lambda_{min}$ is valid, wherein $\lambda_p$ is the pump radiation wavelength, $\eta$ is the refractive index of the dye solution, and $\lambda_{min}$ is the shortest dye-laser wavelength to be generated. By substituting typical values, e.g., $\lambda_p = 360$ nm, $\eta = 1.3$, and $\lambda_{min} = 380$ nm, it is made readily apparent that a numerical aperture of less than 1.3 will always be adequate, while the demands on the numerical aperture decrease with longer laser wavelength.

Although most microscope lenses are corrected for a fixed image distance of 16 to 20 cm, image quality adequate for the present purpose is readily obtained by limited variation of the spacing between grating 12 and microscope lens 13; this is sufficient for obtaining dye-laser emission by distributed feedback. Varying the image distance by shifting the microscope objective 13, together with the cell 15 set at its light-exit surface, by only a maximum of a few centimeters, the grating constant of the interference pattern and, therefore, the laser wavelength, can be continuously varied. Experiments have revealed that, when several dyes are used (while maintaining a constant refractive index in the dye solution) the wavelength can be varied by a factor as high as 1.5. When the refractive index of the solvent is also varied, a tuning range of an octave is possible, i.e., from a minimum wavelength of about 380 nm to about 760 nm in the near infrared spectrum. In order to get infrared laser emission, it is merely necessary to remove mask 14 (FIG. 1); when this is done the image produced using the zero order portion of the beam has a period extended by a factor of 2 to permit laser emission with the wavelength doubled.

An especially convenient method for varying the wavelength of the laser emission is illustrated in FIG. 2. In this case, a variable-focus or zoom lens 17 is positioned between grating 12 and imaging device 13 so that an intermediate image 16 of the grating 12 is formed. This intermediate image 16 is positioned at a location which has a distance from the microscope lens system 13 equal to the image distance for which the microscope objective 13 is corrected. By adjusting the variable enlargement of zoom lens 17, the periodicity of the lines in the intermediate image 16 can be varied within broad limits, so that the wavelength of the dye-laser emission L can be controlled in a very convenient fashion.

In producing the required striped pattern, the reflection from a glass optical wedge with a suitable sphenoidal angle can be used instead of grating 12, by means of which interference stripes of identical width can be produced; two glass plates with an optically variable wedge or sphenoidal angle arranged in suitable relation to each other may also be used. Other interferometric devices or holographic gratings can be used to produce the necessary intermediate images or the striped pump laser pattern in the laser medium.

Commercially available microscope lenses should represent the most convenient and cost-favorable possibility for realization of the invention; naturally, other similarly functioning type of objective lenses, which are not specifically intended for use with microscopes, can also be used in lieu thereof. Instead of dye solutions, semiconductors can also be used as the laser-active media in certain applications, since in many respects they possess optical characteristics similar to those of dye solutions, especially at longer wavelengths.

We claim:

1. A distributed feedback laser for generating laser radiation, comprising:
   an active laser medium;
   a pump radiation source for generating a beam of pump radiation directed along a pump radiation beam path;
   optical pattern means, positioned in said beam path, for generating a pump radiation intensity pattern of regions of alternating high and low pump radiation intensity;
   demagnifying optical means, positioned in said beam path between said optical pattern means and said laser medium to produce, from said radiation pattern, a pair of pump radiation beams intersecting each other and thereby producing an interference pattern, based on said radiation pattern, in said laser medium;
   and optical mask means, positioned in said beam path between said optical pattern means and said laser medium, for effectively limiting the radiation reaching the laser medium to said pair of beams.

2. A distributed feedback laser according to claim 1 in which said demagnifying optical means comprises a microscope objective.

3. A distributed feedback laser according to claim 2 in which the microscope objective has a nominal magnification factor of 40 to 60.

4. A distributed feedback laser according to claim 1 in which the optical pattern means comprises a diffraction grating with line-shaped diffraction elements.

5. A distributed feedback laser according to claim 4 in which the demagnifying optical means is a microscope objective.

6. A distributed feedback laser according to claim 4 in which the optical mask means comprises an opaque mask located in the pump radiation beam path ahead of the demagnifying optical means in position to screen out the zero order of diffraction.

7. A distributed feedback laser according to claim 1 further comprising an imaging device, interposed between the optical pattern means and the demagnifying optical means, for producing a striped intermediate image of said radiation pattern in an object plane of the demagnifying optical means.

8. A distributed feedback laser according to claim 7 in which the optical pattern means comprises a diffraction grating with line-shaped diffraction elements.

9. A distributed feedback laser according to claim 7 in which the demagnifying optical means is a microscope objective.

10. A distributed feedback laser according to claim 7 in which the imaging means is a variable focus lens having a variable enlargement capability.

11. A distributed feedback laser according to claim 1 in which the optical pattern means comprises an interferometric device which produces interference stripes of equal width.

12. A distributed feedback laser according to claim 11 in which the demagnifying optical means is a microscope objective.

13. A distributed feedback laser according to claim 11 further comprising an imaging device, interposed between the optical pattern means and the demagnifying optical means, for producing a striped intermediate image of said radiation pattern in an object plane of the demagnifying optical means.

14. A distributed feedback laser for generating laser radiation, comprising:

an active laser medium;

a pump radiation source for generating a beam of pump radiation directed along a pump radiation beam path, optical pattern means, positioned in said beam path, for generating a pump radiation intensity pattern of regions of alternating high and low pump radiation intensity;

demagnifying optical means, positioned in said beam path between said optical pattern means and said laser medium to produce, from said radiation pattern, a pair of pump radiation beams intersecting each other and thereby producing an interference pattern, based on said radiation pattern, in said laser medium; and imaging means, including a variable focus lens having a variable enlargement capability, interposed between the optical pattern means and the demagnifying optical means, for producing a striped intermediate image of said radiation pattern in an object plane of the demagnifying means.

15. A distributed feedback laser according to claim 14 in which the optical pattern means comprises a diffraction grating with line-shaped diffraction elements.

16. A distributed feedback laser according to claim 14 in which the demagnifying optical means is a microscope objective.

* * * * *